US010194117B2

(12) United States Patent
Bayley et al.

(10) Patent No.: US 10,194,117 B2
(45) Date of Patent: Jan. 29, 2019

(54) COMBINING AUDIO AND VIDEO STREAMS FOR A VIDEO HEADSET

(71) Applicant: Plantronics, Inc., Santa Cruz, CA (US)

(72) Inventors: Antony M W Bayley, Royal Wootton Bassett (GB); Peter K Reid, Marlborough (GB); Simon Goddard, Malmesbury (GB)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/299,190

(22) Filed: Oct. 20, 2016

(65) Prior Publication Data

US 2018/0115744 A1   Apr. 26, 2018

(51) Int. Cl.
| | |
|---|---|
| *H04N 7/06* | (2006.01) |
| *G06F 3/16* | (2006.01) |
| *H04N 5/04* | (2006.01) |
| *H04N 1/21* | (2006.01) |
| *H04N 5/77* | (2006.01) |
| *H04N 9/82* | (2006.01) |

(52) U.S. Cl.
CPC ............... *H04N 7/06* (2013.01); *G06F 3/16* (2013.01); *H04N 1/2112* (2013.01); *H04N 5/04* (2013.01); *H04N 5/77* (2013.01); *H04N 9/8211* (2013.01)

(58) Field of Classification Search
CPC .................................................. H04N 9/8042
USPC ........................................................... 386/338
See application file for complete search history.

(56) References Cited

U.S. PATENT DOCUMENTS

| 9,167,333 | B2 | 10/2015 | Johnston et al. | |
|---|---|---|---|---|
| 9,392,353 | B2 | 7/2016 | Johnston et al. | |
| 2006/0227224 | A1* | 10/2006 | Kawata ................... | H04N 5/232 348/231.99 |
| 2008/0002948 | A1* | 1/2008 | Murata .................... | H04S 1/005 386/338 |
| 2011/0115878 | A1* | 5/2011 | Noteware .............. | H04N 7/147 348/14.12 |

* cited by examiner

*Primary Examiner* — Jefferey F Harold
*Assistant Examiner* — Sihar A Karwan

(57) ABSTRACT

A wearable device and corresponding methods and computer-readable media are disclosed, where the method comprises: receiving a first audio signal from an audio communication device; providing first audio based on the first audio signal; capturing second audio, wherein the second audio represents a voice of a wearer of the wearable device; generating a second audio signal, wherein the second audio signal represents the second audio; transmitting the second audio signal to the audio communication device; capturing video; providing a video signal, wherein the video signal represents the video; capturing third audio, wherein the third audio represents ambient sound; generating a third audio signal, wherein the third audio signal represents the third audio; and synchronously encoding, into a single data stream, the first audio signal, the second audio signal, the third audio signal, and the video signal.

14 Claims, 3 Drawing Sheets

COMBINING AUDIO AND VIDEO STREAMS FOR A VIDEO HEADSET

FIELD

The present disclosure relates generally to the field of audio and video processing and transmission. More particularly, the present disclosure relates to combining audio and video streams.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Conventional video recording systems generally produce a recording that includes a video channel that represents video captured by the camera and one or more audio channels that represent ambient sound captured by one or more microphones. Conventional telephone recording systems generally produce one or more audio channels that represent audio of conversations between two or more callers.

SUMMARY

In general, in one aspect, an embodiment features a wearable device comprising: a communications subsystem comprising a receiver configured to receive a first audio signal from an audio communication device, a speaker configured to provide first audio based on the first audio signal, a first microphone configured to capture second audio, wherein the second audio represents a voice of a wearer of the wearable device, and to generate a second audio signal, wherein the second audio signal represents the second audio, and a transmitter configured to transmit the second audio signal to the audio communication device; and a camera subsystem comprising a video camera configured to capture video, and to provide a video signal, wherein the video signal represents the video, a second microphone configured to capture third audio, wherein the third audio represents ambient sound, and to generate a third audio signal, wherein the third audio signal represents the third audio, and a video encoder configured to synchronously encode, into a single data stream, the first audio signal, the second audio signal, the third audio signal, and the video signal.

Embodiments of the wearable device may include one or more of the following features. In some embodiments, the first audio signal, the second audio signal, the third audio signal, and the video signal are contextually related. Some embodiments comprise a sidetone generator configured to mix the first audio signal and the second audio signal prior to the video encoder synchronously encoding, into the single data stream, the first audio signal, the second audio signal, the third audio signal, and the video signal. In some embodiments, the transmitter is a first transmitter, and the wearable device further comprises: a second transmitter configured to transmit the single data stream from the wearable device. In some embodiments, the single data stream includes a stereo audio channel comprising a first sub-channel and a second sub-channel; the video encoder is further configured to encode, into the first sub-channel, the first audio signal and the second audio signal; and the video encoder is further configured to encode, into the second sub-channel, the third audio signal. In some embodiments, the transmitter is a first transmitter, and the wearable device further comprises: a second transmitter configured to transmit the single data stream from the wearable device. Some embodiments comprise a headset.

In general, in one aspect, an embodiment features a method for a wearable device, the method comprising: receiving a first audio signal from an audio communication device; providing first audio based on the first audio signal; capturing second audio, wherein the second audio represents a voice of a wearer of the wearable device; generating a second audio signal, wherein the second audio signal represents the second audio; transmitting the second audio signal to the audio communication device; capturing video; providing a video signal, wherein the video signal represents the video; capturing third audio, wherein the third audio represents ambient sound; generating a third audio signal, wherein the third audio signal represents the third audio; and synchronously encoding, into a single data stream, the first audio signal, the second audio signal, the third audio signal, and the video signal.

Embodiments of the method may include one or more of the following features. In some embodiments, the first audio signal, the second audio signal, the third audio signal, and the video signal are contextually related. Some embodiments comprise mixing the first audio signal and the second audio signal prior to the video encoder synchronously encoding, into the single data stream, the first audio signal, the second audio signal, the third audio signal, and the video signal. Some embodiments comprise transmitting the single data stream from the wearable device. Some embodiments comprise encoding, into a first sub-channel of a stereo audio channel of the single data stream, the first audio signal and the second audio signal; and encoding, into a second sub-channel of the stereo audio channel of the single data stream, the third audio signal. Some embodiments comprise transmitting the single data stream from the wearable device.

In general, in one aspect, an embodiment features computer-readable media embodying instructions executable by a computer in a wearable device to perform functions comprising: receiving a first audio signal from an audio communication device, wherein the wearable device provides first audio based on the first audio signal; receiving a second audio signal, wherein the second audio signal represents second audio captured by the wearable device, wherein the second audio represents a voice of a wearer of the wearable device; causing transmission of the second audio signal to the audio communication device; and receiving a video signal, wherein the video signal represents video captured by the wearable device; receiving a third audio signal, wherein the third audio signal represents ambient sound captured by the wearable device; and synchronously encoding, into a single data stream, the first audio signal, the second audio signal, the third audio signal, and the video signal.

Embodiments of the computer-readable media may include one or more of the following features. In some embodiments, the first audio signal, the second audio signal, the third audio signal, and the video signal are contextually related. In some embodiments, the functions further comprise: mixing the first audio signal and the second audio signal prior to the video encoder synchronously encoding, into the single data stream, the first audio signal, the second audio signal, the third audio signal, and the video signal. In some embodiments, the functions further comprise: causing transmission of the single data stream from the wearable device. In some embodiments, the functions further comprise: encoding, into a first sub-channel of a stereo audio channel of the single data stream, the first audio signal and the second audio signal; and encoding, into a second sub-channel of the stereo audio channel of the single data stream, the third audio signal. In some embodiments, the functions further comprise: causing transmission of the single data stream from the wearable device.

The details of one or more implementations are set forth in the accompanying drawings and the description below. Other features will be apparent from the description and drawings, and from the claims.

Figure 1:
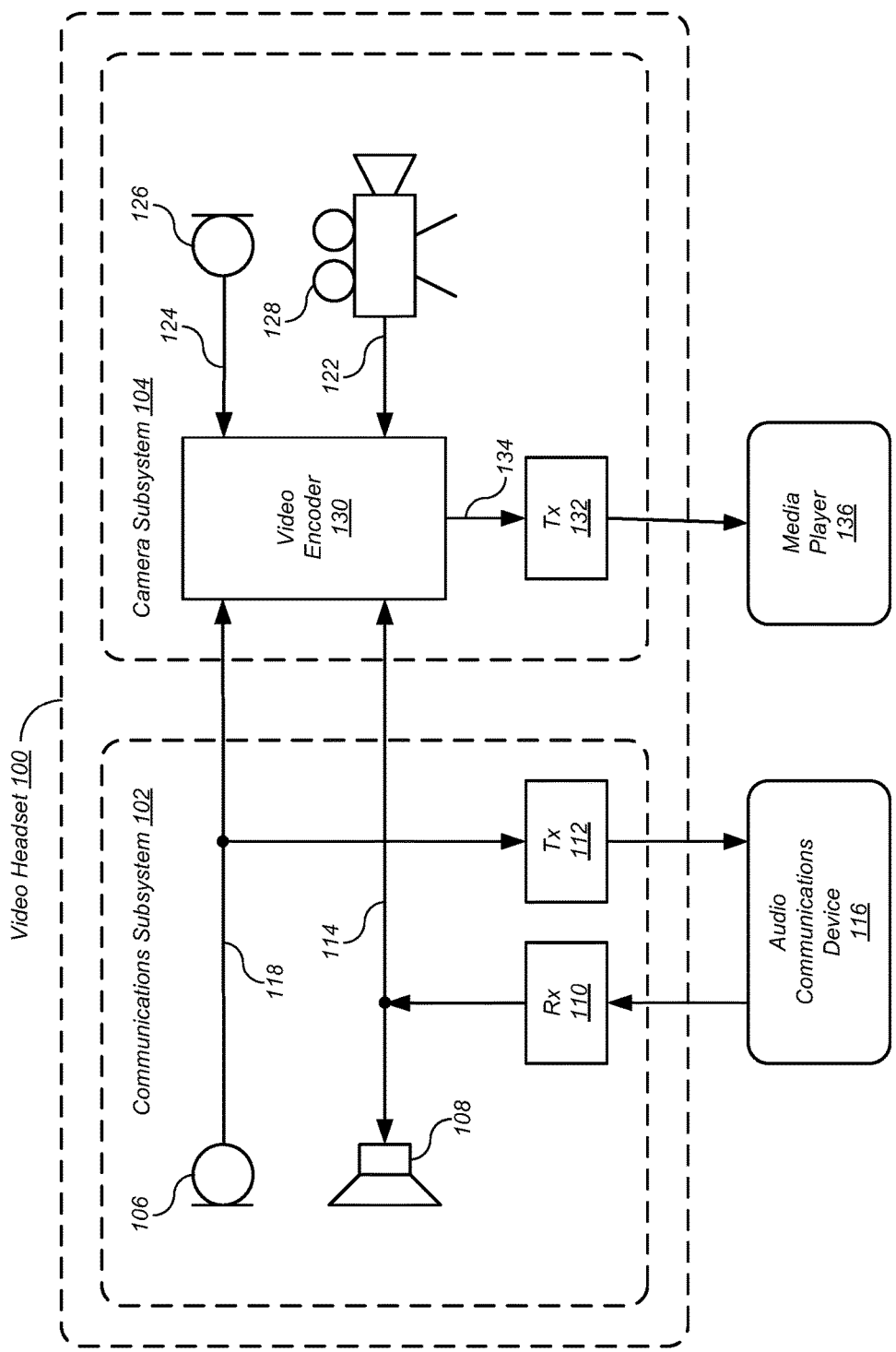
FIG. 1 shows elements of a video headset according to one embodiment.

The leading digit(s) of each reference numeral used in this specification indicates the number of the drawing in which the reference numeral first appears.

DETAILED DESCRIPTION

Embodiments of the present disclosure synchronously combine audio and video streams for a video headset. The resulting combined data stream may include synchronized video, ambient sound and communications audio streams, and may be recorded, live-streamed, and the like. In the described embodiments multiple audio streams are combined with a single video stream in a single data stream. But in other embodiments, multiple video streams may be combined with multiple audio streams. For example the video streams may be generated by a stereoscopic video camera with left-eye and right-eye video streams, by forward-facing and rear-facing cameras to give 360 degree vision, and the like.

In various embodiments, the audio and video streams are contextually related. Therefore the resulting combined data stream yields more information than any of the constituent audio and video streams in isolation. Simultaneous, time-synchronized playback maintains the contextual links between the different audio and video streams in a way that is not possible if each stream is experienced independently. Consider the case where a remote caller who is viewing the headset wearer's live video stream says "She's in the red car to your left." That statement is of limited use in a telephone call recording. However it is very useful if simultaneous video and communications audio recordings can be played back in sync. The person playing back the recording will be able to see the car, read the license plate of the car and probably see the woman who is being discussed on the phone call.

Other features are contemplated as well.

FIG. 1 shows elements of a video headset 100 according to one embodiment. Although in the described embodiment elements of the video headset 100 are presented in one arrangement, other embodiments may feature other arrangements. For example, elements of the video headset 100 may be implemented in hardware, software, or combinations thereof. As another example, various elements of the video headset 100 may be implemented as one or more digital signal processors.

Referring to FIG. 1, the video headset 100 may include a communications subsystem 102 and a camera subsystem 104. The communications subsystem 102 may include a microphone 106, a speaker 108, a receiver (Rx) 110 and a transmitter (Tx) 112. The receiver 110 may receive an inbound audio signal 114 or a representation thereof, for example from an audio communications device 116, and may provide the inbound audio signal 114 to the speaker 108. The speaker 108 may render the inbound audio signal 114 for the wearer of the video headset 100. The microphone 106 may capture the voice of the wearer and may provide the resulting outbound audio signal 118 to the transmitter 112. The transmitter 112 may provide the outbound audio signal 118 or a representation thereof to the audio communications device 116. The audio communications device 116 may be any audio communications device. For example, the audio communications device 116 may be a smartphone or the like.

The camera subsystem 104 may include a microphone 126, a videocamera 128, a video encoder 130 and a transmitter (Tx) 132. The microphone 126 may capture ambient audio and may provide the resulting ambient audio signal 124 to the video encoder 130. The videocamera 128 may capture video and may provide the resulting video signal 122 to the video encoder 130. The video encoder 130 may also receive the inbound audio signal 114 and the outbound audio signal 118 from the communications subsystem 102. The video encoder 130 may synchronously encode the inbound audio signal 114, the outbound audio signal 118, the ambient audio signal 124 and the video signal 122 into a single data stream 134, and may provide the single data stream 134 to the transmitter 132. The transmitter 132 may transmit the single data stream 134 from the video headset 100, for example to a media player 136 that may render the single data stream 134 for a user.

The video headset 100 of FIG. 1 has many applications. For example, the video headset 100 is well-suited for the case when video streaming or recording occurs at the same time as two-way voice communications (telephone call, radio conversation, etc.) and the video, ambient sound and communications speech are contextually related.

Figure 2:
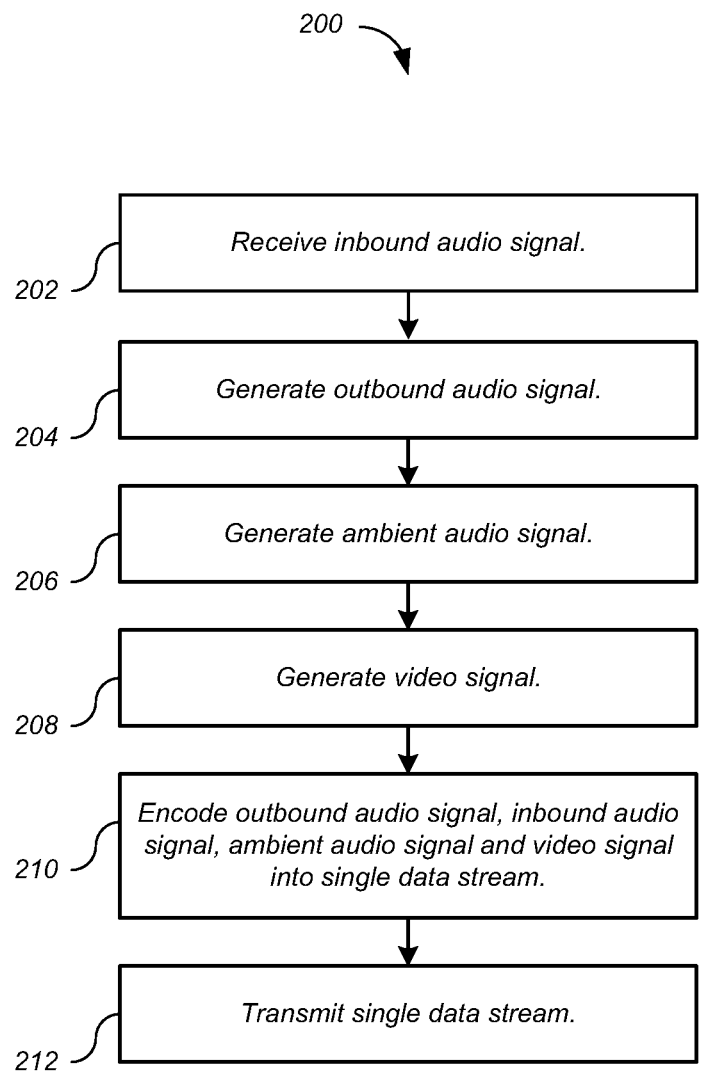
FIG. 2 shows a process for the video headset of FIG. 1 according to one embodiment.

FIG. 2 shows a process 200 for the video headset 100 of FIG. 1 according to one embodiment. Although in the described embodiments the elements of process 200 are presented in one arrangement, other embodiments may feature other arrangements. For example, in various embodiments, some or all of the elements of process 200 can be executed in a different order, concurrently, and the like. Also some elements of process 200 may not be performed, and may not be executed immediately after each other. In addition, some or all of the elements of process 200 can be performed automatically, that is, without human intervention.

Referring to FIG. 2, at 202, the receiver 110 of the communications subsystem 102 may receive the inbound audio signal 114 or a representation thereof. The inbound audio signal 114 may represent voices of one or more parties to a telephone call. At 204, the microphone 106 of the communications subsystem 102 may capture the voice of the wearer and may generate the resulting outbound audio signal 118. At 206, the microphone 126 may capture ambient audio and may generate the resulting ambient audio signal 124. At 208, the videocamera 128 may capture video and may generate the resulting video signal 122. At 210, the video encoder 130 may synchronously encode the outbound audio signal 118, the inbound audio signal 114, the ambient audio signal 124, and the video signal 122 into a single data stream 134.

Figure 3:
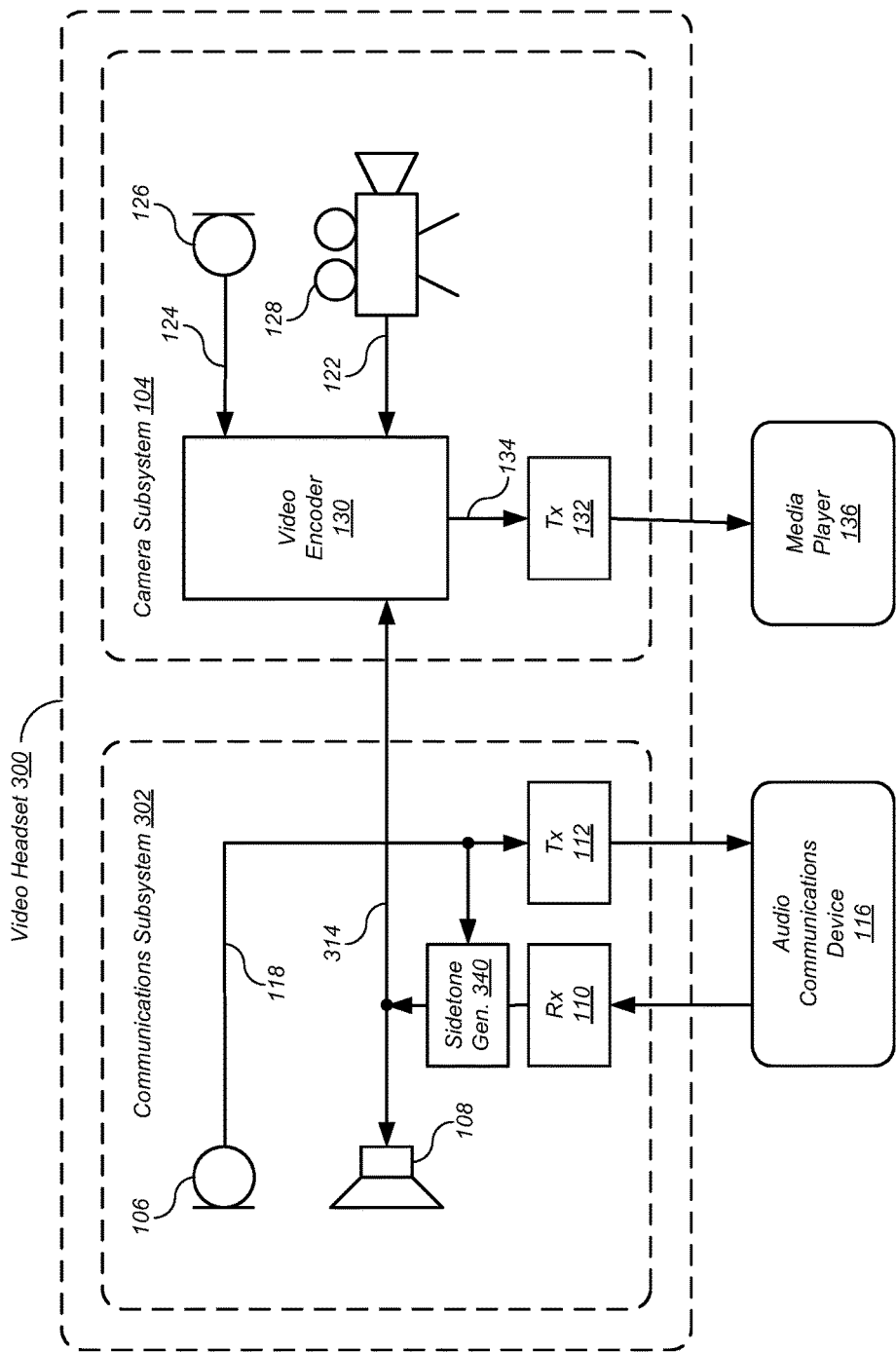
FIG. 3 shows elements of a video headset according to an embodiment that advantageously employs the use of sidetone.

The single data stream 134 may have any container format. In one embodiment, the format is MP4. The single data stream 134 may have one or more audio channels. In one embodiment, the single data stream 134 has a separate channel for each audio signal 114, 118, 124. In that embodiment a user of the single data stream 134 may listen to any audio channel individually or in any combination. In another embodiment, the single data stream 134 includes one video channel and a stereo audio channel where the inbound audio signal 114 and the outbound audio signal 118 are mixed and encoded into one of the stereo audio channels and the ambient audio signal 124 is encoded into the other one of the stereo audio channels. In that embodiment, a user of the single data stream 134 may listen to the ambient audio, the headset audio, or both by adjusting the audio balance control of the media player 136. FIG. 3 shows elements of a video headset 300 according to an embodiment that advantageously employs the use of sidetone. Although in the described embodiment elements of the video headset 300 are presented in one arrangement, other embodiments may feature other arrangements. For example, elements of the video headset 300 may be implemented in hardware, software, or combinations thereof. As another example, various elements of the video headset 300 may be implemented as one or more digital signal processors.

Referring to FIG. 3, the video headset 300 is similar to the video headset 100 of FIG. 1, but with the addition of a sidetone generator 340 to the communications subsystem 302. Instead of being routed to the video encoder 130, the outbound audio signal 118 is routed to the sidetone generator 340, which mixes a proportion of the outbound audio signal 118 into the inbound audio signal 314 that is received from the far end talker, so that the headset wearer hears his own voice in the headset's speaker 108. Therefore the outbound microphone audio signal 118 does not need to be separately routed to the video encoder 130 because the sidetone generator 340 ensures that the outbound microphone audio signal 118 is present in the inbound audio signal 314 that is routed to the video encoder 130.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. For example, in a system where the communications subsystem 102 employs a high level of sidetone, it is not necessary to provide the outbound audio 118 to the video encoder 130 because the outbound audio 118 will be present in the inbound audio due to the high sidetone level. Accordingly, other implementations are within the scope of the following claims.

What is claimed is:

1. A wearable device comprising:
a communications subsystem comprising
a receiver configured to receive a first audio signal from an audio communication device,
a speaker configured to provide first audio based on the first audio signal,
a first microphone configured to capture second audio, wherein the second audio represents a voice of a wearer of the wearable device, and to generate a second audio signal, wherein the second audio signal represents the second audio, and
a first transmitter configured to receive the second audio signal from the first microphone, and to transmit the second audio signal to the audio communication device; and
a camera subsystem comprising
a video camera configured to capture video, and to provide a video signal, wherein the video signal represents the video,
a second microphone configured to capture third audio, wherein the third audio represents ambient sound, and to generate a third audio signal, wherein the third audio signal represents the third audio,
a video encoder communicatively coupled to the communications subsystem and configured to receive the first audio signal, the second audio signal, the video signal, and the third audio signal, and to synchronously encode, into a single data stream, the first audio signal, the second audio signal, the third audio signal, and the video signal, and
a second transmitter configured to transmit the single data stream from the wearable device.

2. The wearable device of claim 1, wherein the first audio signal, the second audio signal, the third audio signal, and the video signal are contextually related.

3. The wearable device of claim 1, further comprising:
a sidetone generator configured to mix the first audio signal and the second audio signal prior to the video encoder synchronously encoding, into the single data stream, the first audio signal, the second audio signal, the third audio signal, and the video signal.

4. The wearable device of claim 1, wherein:
the single data stream includes a stereo audio channel comprising a first sub-channel and a second sub-channel;
the video encoder is further configured to encode, into the first sub-channel, the first audio signal and the second audio signal; and
the video encoder is further configured to encode, into the second sub-channel, the third audio signal.

5. The wearable device of claim 1, further comprising:
a headset.

6. A method for a wearable device, the method comprising:
receiving a first audio signal from an audio communication device;
providing first audio based on the first audio signal;
capturing second audio, wherein the second audio represents a voice of a wearer of the wearable device;
generating a second audio signal, wherein the second audio signal represents the second audio;
transmitting the second audio signal to the audio communication device;
capturing video;
providing a video signal to a video encoder, wherein the video signal represents the video;
capturing third audio, wherein the third audio represents ambient sound;
generating a third audio signal, wherein the third audio signal represents the third audio;
providing the first audio signal, the second audio signal, and the third audio signal to the video encoder;
synchronously encoding, into a single data stream, the first audio signal, the second audio signal, the third audio signal, and the video signal; and
transmitting the single data stream from the wearable device.

7. The method of claim 6, wherein the first audio signal, the second audio signal, the third audio signal, and the video signal are contextually related.

8. The method of claim 6, further comprising:
mixing the first audio signal and the second audio signal prior to the video encoder synchronously encoding, into the single data stream, the first audio signal, the second audio signal, the third audio signal, and the video signal.

9. The method of claim 6, further comprising:
encoding, into a first sub-channel of a stereo audio channel of the single data stream, the first audio signal and the second audio signal; and
encoding, into a second sub-channel of the stereo audio channel of the single data stream, the third audio signal.

10. A non-transitory computer-readable medium embodying instructions executable by a computer in a wearable device to perform functions comprising:
receiving a first audio signal from an audio communication device, wherein the wearable device provides first audio based on the first audio signal;
receiving a second audio signal, wherein the second audio signal represents second audio captured by the wearable device, wherein the second audio represents a voice of a wearer of the wearable device;
causing transmission of the second audio signal to the audio communication device; and
receiving a video signal, wherein the video signal represents video captured by the wearable device;
receiving a third audio signal, wherein the third audio signal represents ambient sound captured by the wearable device;
providing the first audio signal, the second audio signal, the third audio signal, and the video signal to a video encoder;
synchronously encoding, into a single data stream, the first audio signal, the second audio signal, the third audio signal, and the video signal; and
causing transmission of the single data stream from the wearable device.

11. The computer-readable medium of claim 10, wherein the first audio signal, the second audio signal, the third audio signal, and the video signal are contextually related.

12. The computer-readable medium of claim 10, wherein the functions further comprise:
mixing the first audio signal and the second audio signal prior to the video encoder synchronously encoding, into the single data stream, the first audio signal, the second audio signal, the third audio signal, and the video signal.

13. The computer-readable medium of claim 10, wherein the functions further comprise:
encoding, into a first sub-channel of a stereo audio channel of the single data stream, the first audio signal and the second audio signal; and
encoding, into a second sub-channel of the stereo audio channel of the single data stream, the third audio signal.

14. The wearable device of claim 1, wherein the first audio signal originates from a far end of an active telephone call.

* * * * *